United States Patent Office

3,344,001
Patented Sept. 26, 1967

3,344,001
HYDRAZINE BORATE FLUXES
Raymond Thompson, Esher, England, assignor to United States Borax & Chemical Corporation, Los Angeles, Calif.
No Drawing. Filed May 12, 1965, Ser. No. 455,331
Claims priority, application Great Britain, June 24, 1964, 26,189/64
6 Claims. (Cl. 148—23)

ABSTRACT OF THE DISCLOSURE

Hydrazine borate is employed as a flux for joining together metal surfaces such as by soft soldering, brazing and welding. Flux compositions and core solder containing hydrazine borate are provided.

---

This invention relates to fluxes for removing oxide layers from, and preventing the formation of such layers on, heated metallic (including alloy) surfaces, and to the use of such fluxes, especially in the formation of soldered joints. The expression "soldering" as used herein refers to the joining together of metallic surfaces by means of a lower melting metallic filler and includes soft soldering, brazing and welding.

Fluxes have to be used when two metals are soldered together to prevent the oxidation of the heated surfaces of the metals being joined and of the filler metal. The flux also serves to remove oxide coatings on the metals being joined thus presenting the clean surface necessary for bonding to take place.

Of the inorganic fluxes used in the formation of brazed or soft soldered joints, those most commonly employed are zinc chloride, ammonium chloride, hydrochloric acid and hydrofluoric acid. These rely upon the activity of the halide constituent to remove the oxide film and tend to leave combined halogen on the surface adjacent to the join. This in turn causes corrosion to occur on the surface of the joined metal unless the excess flux and flux residues are completely removed by washing or some other means. Hydrazine hydrobromide has also been used to some extent as a flux for brazing, but again it is highly corrosive and necessitates careful cleaning of the join and surfaces adjacent thereto after cooling. Like the last three inorganic fluxes listed above, hydrazine hydrobromide gives off corrosive and toxic vapors during use.

Organic fluxes have also been employed in brazing and soft soldering, the most well known being rosin. While this material does not leave corrosive residues after use, it is inefficient in that it fails satisfactorily to clean the metal surface. Therefore, when rosin is used as a flux, unless some additional mechanical treatment is used for cleaning the metal surfaces, the resultant joint is liable to be of poor quality. Halogenated organic materials have also been employed as fluxes but these suffer from the disadvantage of evolving highly toxic vapors in use and leaving highly corrosive residues around the finished join.

It has now been found that fluxes consisting of or containing a hydrazine borate are highly effective for removing oxide layers from, and preventing or reducing the formation of oxide layers on, heated metallic surfaces, Such fluxes are particularly suitable for soldering metals whenever at least one of the metal surfaces to be joined or the lower melting metallic filler or solder is susceptible to the formation of a superficial oxide layer of metal oxide by exposure to the atmosphere at the soldering temperature.

In one aspect, the invention comprises the application to metal and metal alloy surfaces, which are to be heated, of a flux consisting of or containing a hydrazine borate. As hereinbefore indicated, it is of particular importance in soldering operations, as defined above.

The hydrazine borates are highly effective for preventing or reducing superficial oxidation of both ferrous and non-ferrous metallic articles, especially articles of copper, brass, mild steel and stainless steel at the temperatures normally used when they are soldered or brazed, which are usually within the range of from about 150° to 1100° C., especially 600° to 1000° C., and of such metallic fillers used for soldering such articles as soft solder, silver solder or brass. In addition, at such temperatures oxide layers on the surfaces to be bonded are effectively removed. The solid residues and the excess hydrazine borate left in the vicinity of the joint are non-corrosive, and indeed in some cases actually act as a corrosion inhibitor. While some fusing may occur during the use of the hydrazine borate, its magnitude is small and it is not troublesome.

The hydrazine borates suitable for use in the invention can be prepared readily by reaction of boric acid with hydrazine or hydrazine hydrate. The hydrazine can be unsubstituted or substituted, such as the lower alkylhydrazines as, for example, methylhydrazine and ethylhydrazine. By varying the mole ratio of reactants, one can obtain hydrazine borates having various $N_2H_4:B_2O_3$ ratios. The preferred hydrazine borate is hydrazine hexaborate which can be anhydrous or hydrated such as hydrazine hexaborate hexahydrate ($N_2H_4.3B_2O_3.6H_2O$).

The hydrazine borates may be used as such, for example, in powder form, or in association with a suitable solid or liquid solvent or non-solvent diluent, such as in the form of their aqueous solutions. They may be used as, or as a constituent of, the flux cores of cored solders. Compatible fluxing agents, for example, borax or another alkaline borate or one of the other fluxes referred to above, may be used if desired in admixture with the hydrazine borates and such flux mixtures are included within the scope of the invention.

The invention is illustrated by the following examples, but it is not to be considered limited to the specific examples given.

Example I

Hydrazine hexaborate hexahydrate was prepared by combining six moles of boric acid with one mole of hydrazine hydrate in 300 ml. of water and heating the solution to 95° C. The clear solution was cooled to room temperature to precipitate the hexaborate, which was isolated by filtration and air-dried for 24 hours. The compound can be recrystallized from water to give the purified hydrazine hexaborate hexahydrate. Heating the hydrate at elevated temperatures, such as about 250° C., under slight vacuum converts it to the anhydrous form.

Hydrazine hexaborate hexahydrate was dusted on surfaces of two mild steel components to be joined. The surfaces were then brazed together in the conventional manner using silver solder as the filler metal. An excellent bond was formed.

The joined components were allowed to remain in a humid atmosphere for two weeks without any removal of flux or flux residues. The joined components were then compared with control components of mild steel and the degree of corrosion of each observed. In the vicinity of the joint, the joined components were much less corroded than the control.

Example II

Example I was repeated using copper components and soft solder as the filler material. The results were similar to those obtained in Example I except that no corrosion either of the joined components or of the control was observed.

*Example III*

Example I was repeated using brass components and brass as the filler material. The results were similar to those obtained in Example I, except that no corrosion either of the joined components or of the control was observed.

*Example IV*

Example I was repeated using stainless steel components and silver solder as the filler material. The results were similar to those obtained in Example I, except that no corrosion either of the joined components or of the control was observed.

*Example V*

Example I was repeated using stainless steel components and brass as the filler material. The results were similar to those obtained in Example I, except that no corrosion either of the joined components or of the control was observed.

Various changes and modifications of the invention can be made and, to the extent that such variations incorporate the spirit of this invention, they are intended to be included within the scope of the appended claims.

I claim:

1. In the method of joining together metallic surfaces by soldering, the improvement which comprises heating said metallic surfaces in the presence of a hydrazine borate flux.

2. In the method of joining together metallic surfaces by brazing, the improvement which comprises heating said metallic surfaces in the presence of a hydrazine borate flux.

3. In the method of joining together metallic surfaces by welding, the improvement which comprises heating said metallic surfaces in the presence of a hydrazine borate flux.

4. The method according to claim 1 in which said hydrazine borate is hydrazine hexaborate.

5. The method according to claim 2 in which said hydrazine borate is hydrazine hexaborate.

6. The method according to claim 3 in which said hydrazine borate is hydrazine hexaborate.

References Cited

UNITED STATES PATENTS

| | | | |
|---|---|---|---|
| 2,713,315 | 7/1955 | McBride | 148—23 X |
| 2,829,998 | 4/1958 | Glynn et al. | 148—23 |
| 3,220,892 | 11/1965 | Durham | 148—23 |

OTHER REFERENCES

The Chemistry of Hydrazine, Audrieth et al., John Wiley & Sons, 1951. p. 53.

DAVID L. RECK, *Primary Examiner.*

H. F. SAITO, *Assistant Examiner.*